United States Patent [19]

Suzuki

[11] Patent Number: 5,563,986

[45] Date of Patent: Oct. 8, 1996

[54] IMAGE PROCESSING SYSTEM

[75] Inventor: Tadaomi Suzuki, Kanagawa, Japan

[73] Assignee: Fuji Xerox Co., Ltd., Tokyo, Japan

[21] Appl. No.: 44,393

[22] Filed: Apr. 8, 1993

[30] Foreign Application Priority Data

Apr. 10, 1992 [JP] Japan .................................. 4-089176

[51] Int. Cl.⁶ .................................................. G06F 15/00
[52] U.S. Cl. ........................... 395/114; 358/448; 358/468; 395/112
[58] Field of Search ..................... 395/101, 112, 395/114, 113, 115, 116, 117; 355/200, 202, 203, 205–209; 358/448, 468, 408, 450, 296, 434, 498, 401, 403, 405, 406, 404, 443, 464, 467, 486, 496, 497, 437; 347/142

[56] References Cited

U.S. PATENT DOCUMENTS

| | | | |
|---|---|---|---|
| 4,571,699 | 2/1986 | Herzog et al. | 358/408 |
| 4,716,438 | 12/1987 | Farrell | 355/6 |
| 4,970,554 | 11/1990 | Rourke | 355/202 |
| 5,051,779 | 9/1991 | Hikawa | 355/200 |
| 5,124,748 | 6/1992 | Tanabe et al. | 355/203 |
| 5,126,858 | 6/1992 | Kurogane et al. | 358/450 |
| 5,161,037 | 11/1992 | Saito | 358/468 |
| 5,168,371 | 12/1992 | Takayanagi | 358/296 |
| 5,239,388 | 8/1993 | Matsumoto | 358/448 |
| 5,247,371 | 9/1993 | Hikawa et al. | 358/448 |

*Primary Examiner*—Arthur G. Evans
*Assistant Examiner*—Dov Popovici
*Attorney, Agent, or Firm*—Finnegan, Henderson, Farabow, Garrett & Dunner, L.L.P.

[57] ABSTRACT

An image processing system for processing input image data according to the machine operation instructions described in a job control sheet and outputting the processed image data, comprises: instruction recognizing unit for recognizing the machine operation instructions stored in the job control sheet; decision unit for deciding whether execution of the recognized machine operation instructions is possible or impossible; processing unit for processing the input image data processed by the job control sheet when execution of the machine operation instruction is possible, and outputting the processed image data; instruction altering unit for altering the machine operation instructions by an operator of the machine; storing unit for storing input image data; and control unit for controlling all of said units.

12 Claims, 17 Drawing Sheets

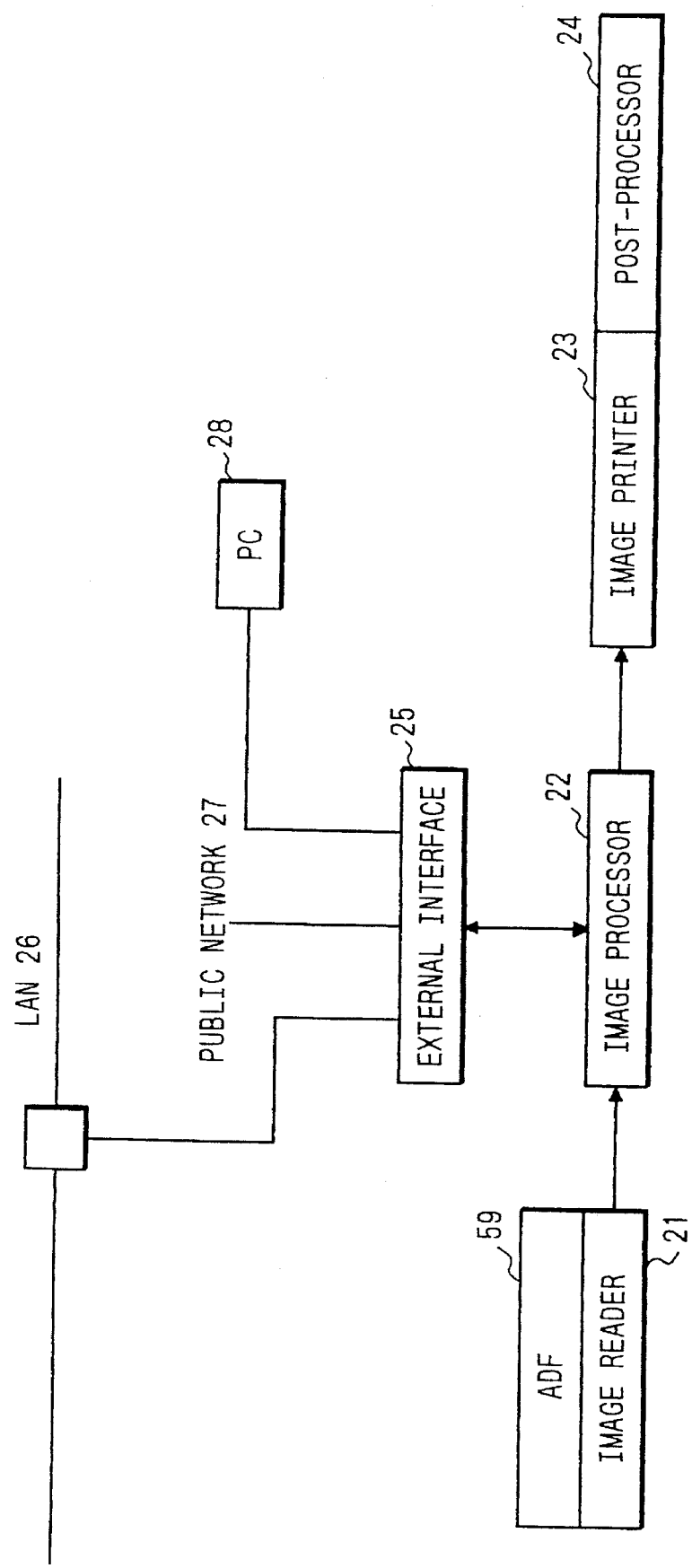

IMAGE PROCESSING SYSTEM

BACKGROUND OF THE INVENTION

1. Field of the Invention

The present invention relates to an image processing system which processes input image data using a sheet-like piece (referred to as a paper user interface) storing operation instructive information of the machine or an electronic paper user interface storing data such as character data and bit map data and outputs the processed image data.

2. Description of the Prior Art

In an apparatus for processing input image data, such as a copying machine, document originals are processed in a state that a stack of the originals is set on an automatic document feeder (ADF). Since a great number of originals can be stacked, a user frequently engages in his work at a location apart from the machine during the processing of the originals. This type of image processing system is typically proposed in U.S. Pat. No. 4,716,438 which discloses an image processing system using paper user interface.

In some states of the system, e.g., a state that all of the recording papers are spent, instructions that cannot be processed are entered to the system. When receiving such requests, the system stops its operation. The documents stacked cannot be processed till the user removes the stop condition. As a result, the efficiency of producing copies or prints by the system is remarkably damaged.

In one of the approaches to solve the problem, when the machine operation instruction that is stored in the paper user interface cannot be executed, the system feeds out of the machine the document originals, which are to be processed according to that instruction from the paper user interface, and executes the next job.

An example of the conventional image processing system is shown in FIG. 10.

The time to advance the job being impossible in execution is inevitably required for the conventional technique. Before execution of the advanced job, the system must wait till the corresponding originals are stacked on the ADF. Here, a wait time essentially exists in the conventional technique.

To remove the stop condition, the machine must notify the operator of the machine being stopped. However, it cannot notify the operator of it when he is apart from the machine. Accordingly, time is consumed till the machine starts again the processing of the originals (this consumed time is called a recovery time). The copying machine of the type in which a number of document originals are stacked on the ADF and are successively processed is very large in size. When the machine is operating, the operator is frequently apart from the machine.

SUMMARY OF THE INVENTION

Accordingly, a first object of the present invention is to provide an image processing system which is free from the time to advance the job being impossible in execution.

A second object of the invention is to provide an image processing system which is free from the wait time, viz., can execute the job being impossible in execution immediately after the stop condition is removed.

A third object of the present invention is to provide an image processing system which reduces the machine stop time, and is efficiently operable for production without any recovery time by improving the way to notify the operator of the machine being stopped and the way to remove the stop condition.

A fourth object of the present invention is to provide an image processing system in which when a user knows a job being impossible in execution, the user enters an instruction to the machine to remove the stop condition.

A fifth object of the present invention is to provide an image processing system in which when a user knows a job being impossible in execution, the user enters the job control sheet again, so that the machine reads the job control sheet to remove the stop condition.

According to first aspect of the invention, there is provided an image processing system for applying the processings of a plural number of jobs to the input image data according to the machine operation instructions, which are definitely described in a job control sheet (JCS), and outputting the processed image data, comprises: instruction recognizing means for recognizing the machine operation instructions stored in the job control sheet; decision means for deciding whether execution of the recognized machine operation instructions is possible or impossible; processing means operating such that when execution of the machine operation instruction is possible, the processing means processes the input image data, which is to be processed according to the job control sheet, and outputs the processed image data; instruction altering means by which an operator of the machine alters the machine operation instructions; means for notifying the operator of the job being impossible in execution when the machine operation instruction cannot be executed, and storing means for storing input image data; and control means for controlling all of the means, wherein when the machine operation instruction, which are supplied from the job control sheet and recognized, cannot be executed, the input image data processed according to the operation instruction of the job control sheet are stored into the storing means, not output, and notifies the operator of the job being impossible in execution, while another job waiting for the processing is processed.

In the image processing system as mentioned above, when the machine operation instruction, which are supplied from the job control sheet and recognized, cannot be executed, the input image data processed according to the operation instruction of the job control sheet are stored into the storing means, not output, and notifies the operator of the job being impossible in execution, while another job waiting for the processing is processed, and when the operator alters the machine operation instruction, which are supplied from the job control sheet and recognized, into the machine operation instruction that can be executed, the input image data to be processed according to the altered operation instruction of the job control sheet is read out of the storing means, and the read out input image data is processed and output.

The image processing system as mentioned above, further comprises data transmission means for transmitting data among a plural number of image processing systems and image processing system designating means for designating one of the plural number of image processing systems. In the image processing system, when the machine operation instruction, which are supplied from the job control sheet and recognized, cannot be executed, the input image data processed according to the operation instruction of the job control sheet are stored into the storing means, not output, and notifies the operator of the job being impossible in execution, through the image processing system which the operator has designated using the image processing system designating means.

In the image processing system, data transmission means and image processing system designating means, when the machine operation instruction, which are supplied from the job control sheet and recognized, cannot be executed, the input image data processed according to the operation instruction of the job control sheet are stored into the storing means, not output, and notifies the operator of the job being impossible in execution, through the image processing system which the operator has designated using the image processing system designating means, and notifies the operator of the job being impossible in execution, through the or another image processing system having operation instruction altering means capable of altering the machine operation instructions.

In the image processing system data transmission means and image processing system designating means, image processing system designating means for designating one of the plural number of image processing systems is contained in the job control sheet.

According to another aspect of the invention, there is provided an image processing system for applying the processings of a plural number of jobs to the input image data according to the machine operation instructions, which are definitely described in a job control sheet, and outputting the processed image data, comprises: instruction recognizing means for recognizing the machine operation instructions stored in the job control sheet; decision means for deciding whether execution of the recognized machine operation instructions is possible or impossible; processing means operating such that when execution of the machine operation instruction is possible, the processing means processes the input image data, which is to be processed according to the job control sheet, and outputs the processed image data; means for notifying the operator of the job being impossible in execution when the machine operation instruction cannot be executed; instruction altering means by which an operator of the machine alters the machine operation instructions; storing means for storing input image data; and control means for controlling all of the means, wherein when the machine operation instruction, which are supplied from the job control sheet and recognized, cannot be executed, the input image data to be processed according to the operation instruction of the job control sheet are stored into the storing means, and not output, while another job queue waiting for the processing is processed, wherein when the machine operation instruction, which are supplied from the job control sheet and recognized, cannot be executed, the input image data to be processed according to the operation instruction of the job control sheet are stored into the storing means, the output image of the input job control sheet notifies the operator of the machine operation instruction being impossible in execution, an error message indicating that the machine operation instruction cannot be executed and a job identification number attached to the input image data, which is to be processed according to the operation instruction of the job control sheet are composed on the output job control sheet image, when the operator alters the machine operation instruction, which are supplied from the job control sheet and recognized, into the machine operation instruction that can be executed, the job control sheet is retrieved using the job identification number, and the input image data to be processed according to the altered operation instruction of the retrieved job control sheet is read out of the storing means, and the read out input image data is processed and output.

The image processing system as just mentioned further comprising re-inputting means for re-inputting the job control sheet image containing the error message indicating that the machine operation instruction cannot be executed and the job identification number attached to the input image data, which is to be processed according to the operation instruction of the job control sheet, and job identification number recognizing means for recognizing a job identification number from the re-input job control sheet image, and when the operator alters the machine operation instruction on the output job control sheet image into the machine operation instruction that can be executed, the job identification number is recognized from the re-input job control sheet image, the job control sheet is retrieved using the job identification number, and the input image data to be processed according to the altered operation instruction of the retrieved job control sheet is read out of the storing means, and the read out input image data is processed and output.

When a job control sheet storing machine operation instructions for input image data and the input image data are input to the image processing system and successively processed, the instruction recognizing means first recognizes the operation instructions of the job control sheet. The decision means decides whether or not the recognized operation instructions can be executed by the image processing means. If the execution of the operation instruction is possible, the processing means and the storing means are set according to the contents of the processing. The input image data to be processed according to the operation instructions of the job control sheet is processed and the processed image data is output. If the execution of the operation instruction is impossible, only the operation instructions that can be executed are set in the processing means. The system starts to receive the input image data, and stores the received image data into the storing means. At the same time, the notifying means notifies the operator of the operation instruction being impossible in execution. When the next job waits for processing, it is input, processed and output after the job storage operation ends.

During the execution of the next job, if the operator removes the stop condition using the instruction altering means, the job now being rejected in execution can be executed immediately after the next job execution ends. After the next job execution ends, the job stored in the storing means is read out therefrom for processing.

In the image processing system having data transmission means capable of transmitting data among a plural number of image processing systems, the operator can designate an image processing system to be used for the notice of the instruction execution being impossible, by means of image processing system designating means. When the operation instruction stored in the job control sheet cannot be executed, the image processing system notifies the designated image processing system of the instruction execution being impossible. The operator receives the notice from the image processing system that was designated by the operator himself.

Another image processing system connected to the image processing system by way of the data transmission means may be used for removing the stop condition after the operator receives the execution-impossible notice. When receiving the execution-impossible notice from the designated image processing system, the operator removes the stop condition using the nearest image processing system with the instruction altering means 10, and operates the image processing system to execute the processing of the job.

A job control sheet may be used for the image processing system designating means for designating an image processing system used for notifying the operator of the instruction execution being impossible. Accordingly, the operator can designate the image processing system for execution-impossible notice at the stage of setting the job input in the image processing means.

When a job control sheet storing machine operation instructions for input image data and the input image data are input to the image processing system and successively processed, the instruction recognizing means first recognizes the operation instructions of the job control sheet. The decision means decides whether or not the recognized operation instructions can be executed by the image processing means. If the execution of the operation instruction is possible, the processing means and the storing means are set according to the contents of the processing. The input image data to be processed according to the operation instructions of the job control sheet is processed and the processed image data is output. If the execution of the operation instruction is impossible, only the operation instructions that can be executed are set in the processing means. The system starts to receive the input image data, and stores the received image data into the storing means. At the same time, the notifying means notifies the operator of the operation instruction being impossible in execution. The job control sheet image that is output is used for the notification. The image contains an error message indicating the instruction execution being impossible, and a job identification number attached to the input image data to be processed according the operation instructions of the job control sheet. When the next job waits for processing, it is input, processed and output after the job storage operation ends. When the operator alters the machine operation instruction into that can be executed, the job control sheet is retrieved using the job identification number, and the input image data to be processed according to the altered operation instruction of the retrieved job control sheet is read out of the storing means, and the read out input image data is processed and output.

When the operator alters the machine operation instruction on the output job control sheet image into the machine operation instruction that can be executed, the job identification number recognizing means recognizes the job identification number from the re-input job control sheet image, the job control sheet stored in the storing means is retrieved using the job identification number, and the input image data to be processed according to the altered operation instruction of the retrieved job control sheet is read out of the storing means, and the read out input image data is processed and output.

BRIEF DESCRIPTION OF THE DRAWINGS

FIG. 22 is a block diagram showing a multi-functional digital copying machine as an application of the present invention.

DETAILED DESCRIPTION OF PREFERRED EMBODIMENTS

Some specific embodiments of an image processing system according to the present invention will be described with reference to the accompanying drawings.

Figure 1:
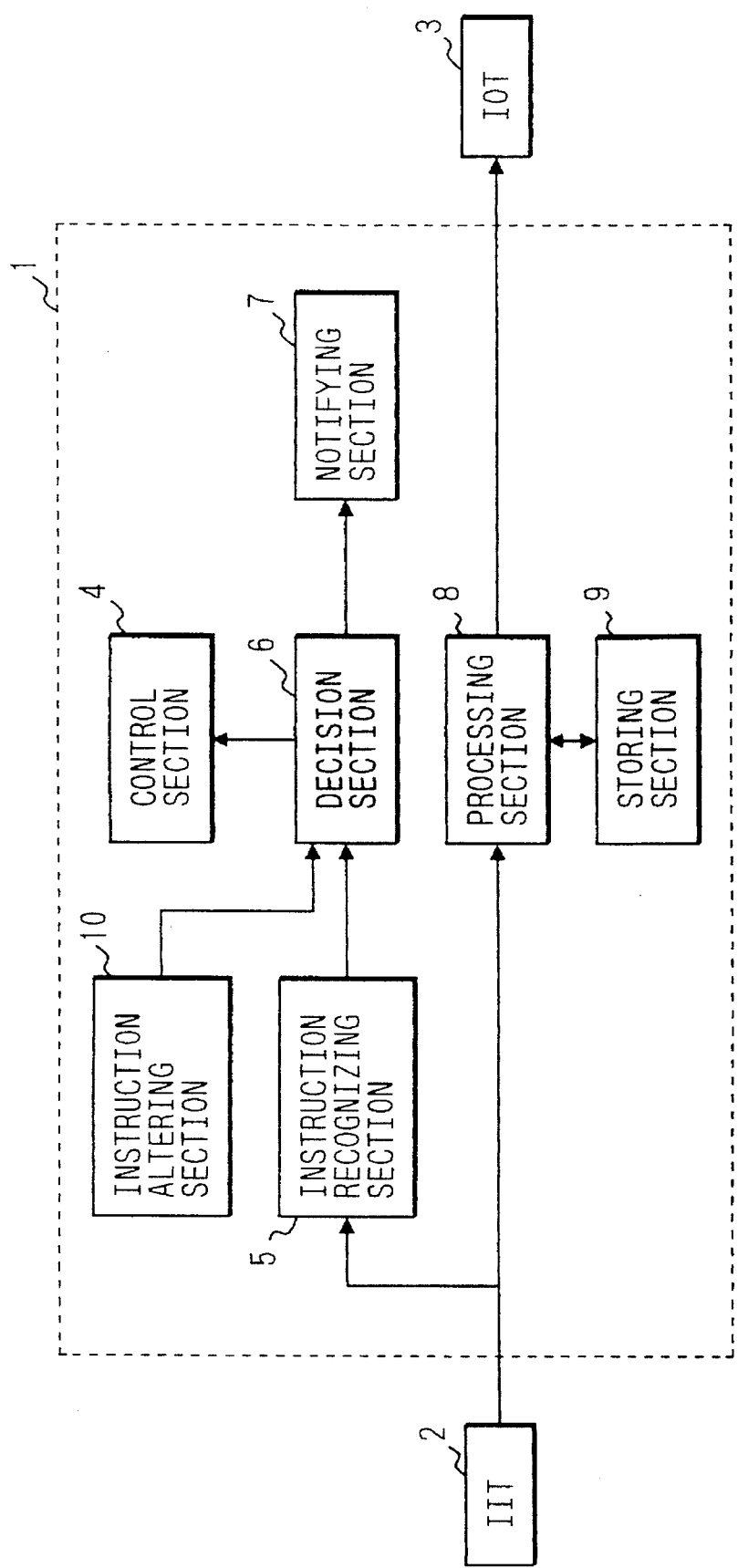
FIG. 1 is a block diagram showing a first embodiment of the invention.
Figure 3:
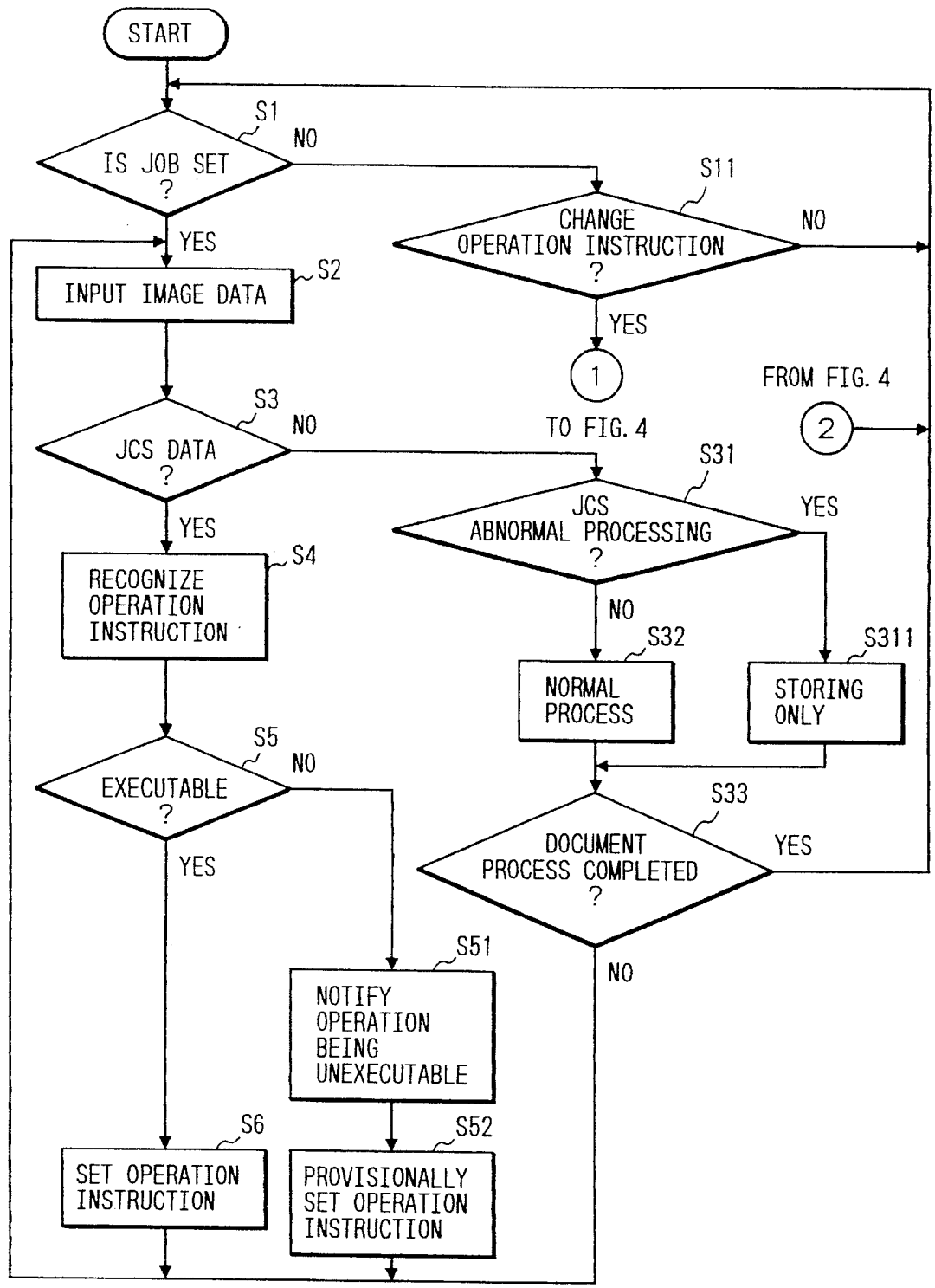
FIG. 3 is a major part of a flowchart showing the operation of each of the systems of FIGS. 1 and 2.
Figure 4:
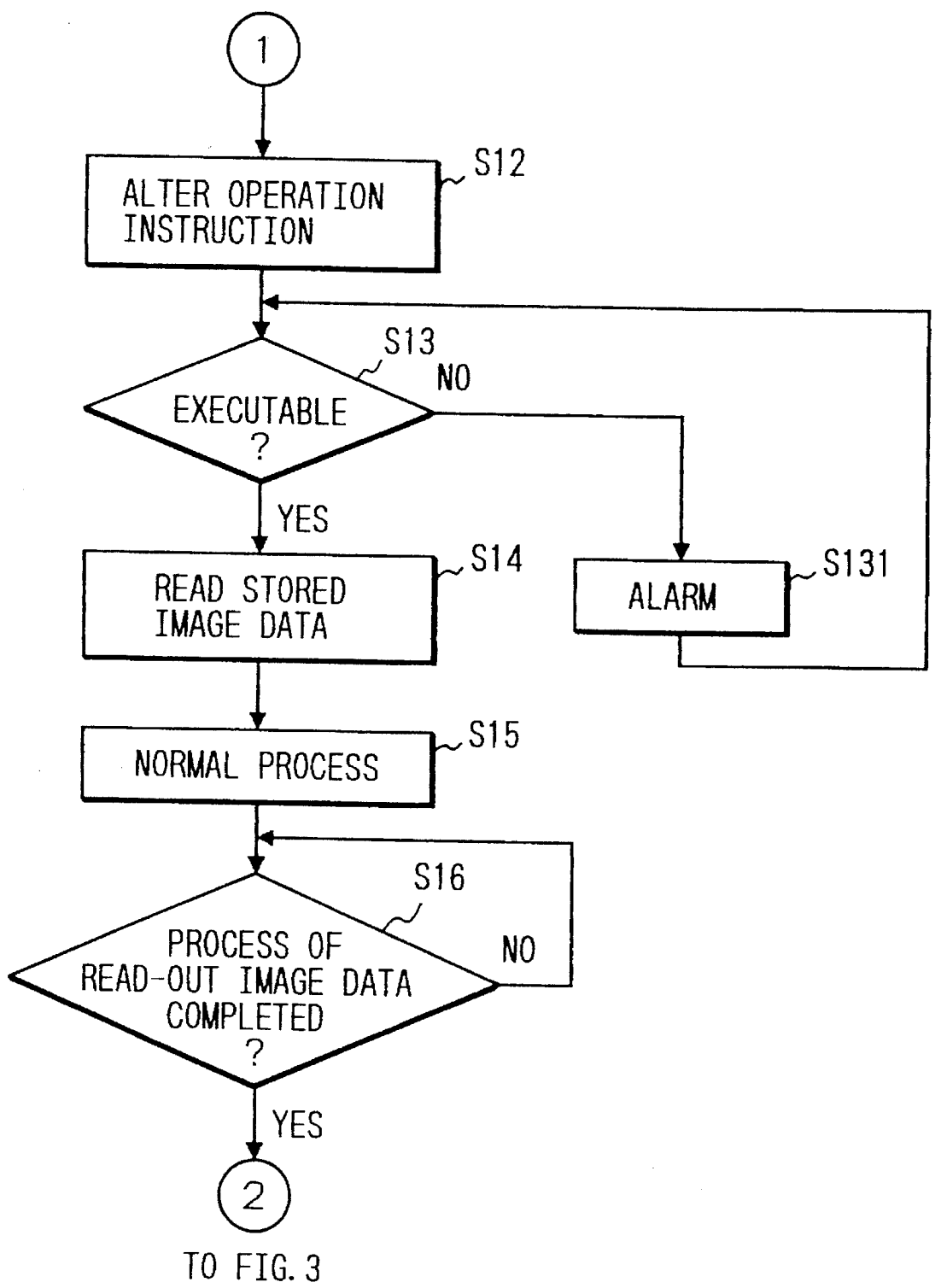
FIG. 4 is a partial flowchart to be coupled with the flowchart of FIG. 3.

FIG. 1 is a block diagram showing an image processing system using the paper user interface according to a first embodiment of the present invention. FIG. 3 is a flow chart showing a control flow in the image processing system.

The image processing system includes an image input terminal (IIT) 2 for inputting image data, an image processor 1 for processing the image data received from the image input terminal 2, and an image output terminal 3 for outputting the image data processed by and output from the image processor 1.

The image processor 1 is made up of a control section 4, an operation instruction recognizing section 5, a decision section 6, a notifying section 7, a processing section 8, a storing section 9, and an operation instruction altering section 10. The instruction recognizing section 5 determines whether the input image data is a job control sheet or another image data, and if it is the job control sheet, recognizes information of machine operation instructions, which are described in the job control sheet. The decision section 6 decides whether the operation instructions recognized by the instruction recognizing section 5 can be executed or not. The notifying section 7 functions such that when the instruction execution is impossible, it notifies the operator of the instruction execution being impossible. The processing section 8 is provided for processing the input image data. The storing section 9 stores the image data processed by the processing section 8. The instruction altering section 10 is used when the operator alters the operation instructions. The control section 4 is provided for the overall control of the image processor 1, and for the intersubsystem controls between the image processor 1 and the image input terminal 2 and between the image processor 1 and the image output terminal 3.

Figure 5:
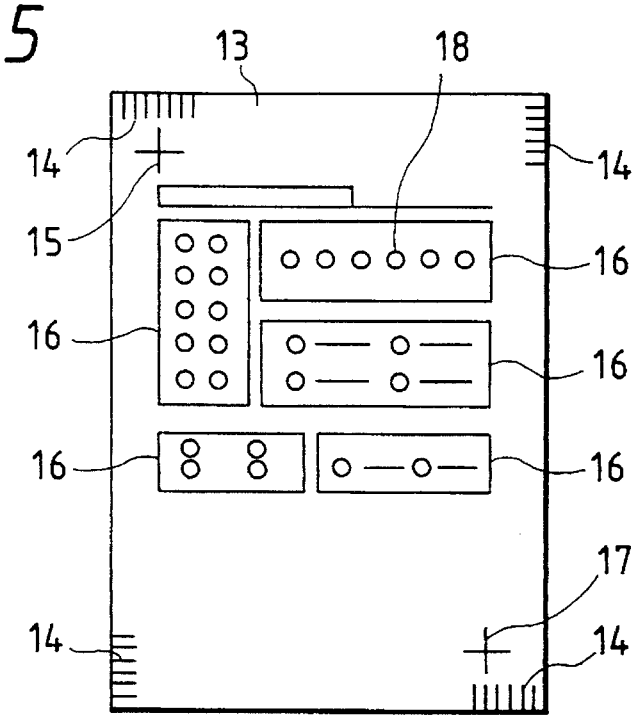
FIG. 5 is a diagram showing a conventional job control sheet.
Figure 6:
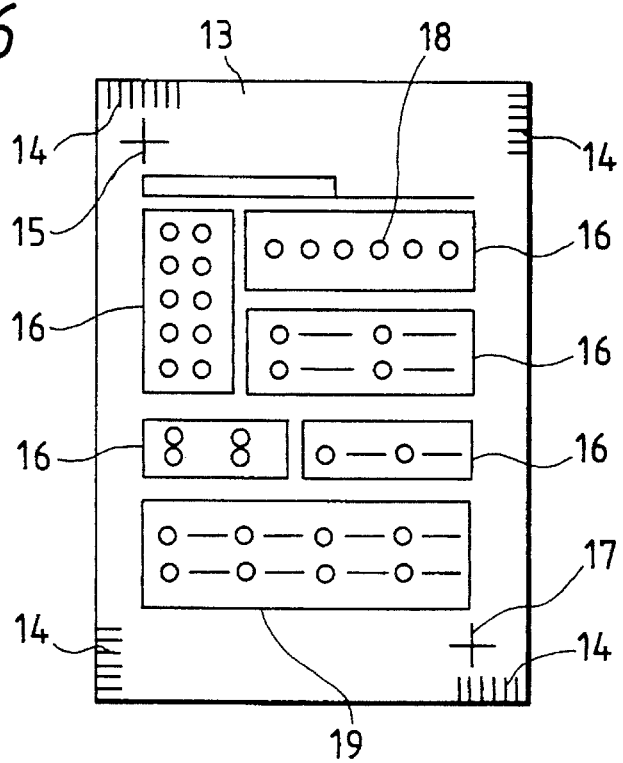
FIG. 6 is diagram showing a job control sheet which is a third embodiment of the present invention.

FIG. 5 shows a conventional job control sheet. FIG. 6 is a job control sheet according to a third embodiment of the present invention.

A job control sheet 13, as shown in FIGS. 5 and 6, contains identification marks 14 as bar codes, for example, located at the four corners of the sheet. The instruction recognizing section 5 checks whether the identification marks 14 are present or absent, and determines whether the input image data is the job control sheet or another image data depending on the result of the check. In the first and second embodiments of the present invention, the job control sheet format shown in FIG. 5 is used.

If the image data input to the image processor 1 is the job control sheet, two coordinates points 15 and 17, an origin and a point positioned diagonal to the origin, are recognized. The recognition of the information described on the sheet is based on those two points (referred frequently to as base points). After the two points are recognized, it is detected whether or not check circles 18 at predetermined coordinates positions have been checked, on the basis of the base points. The result of the detection is operation instruction information described on the job control sheet.

The operation instruction information recognized by the instruction recognizing section 5 is transferred to the decision section 6. The decision section 6 decides whether execution of the operation instruction is possible or impossible. The result of the judgement is transferred to the control section 4. If the execution of the operation instruction is possible, the control section 4 sets the processing section 8 and the storing section 9 according to the operation instruction data, and executes the job in cooperation with the image input terminal 2 and the image output terminal 3.

If the execution of the operation instruction is impossible, for example, when an operator has mistakenly ticked both 70% and 200% for magnification items, the notifying section 7 notifies the operator of the instruction execution being impossible. The notice may be made by a suitable communicative section, for example, sounding a buzzer, displaying the execution-impossible message on the screen of a control panel display, remotely outputting it a TTY terminal, or outputting to the IOT 3 a message such as a transmission-failure report used in facsimile communication. Afterwards, the control section 4 provisionally sets the processing section 8 and the storing section 9. More exactly, in the above case, other operation instructions than the magnification are set in accordance with the operation instruction data, and a default value is set for the magnification. If the default value is 100%, the magnification instruction is set to 100%. On completion of the provisional setting, the inputting of the image data starts again. In this case, the processing currently progressing is an abnormal processing. Accordingly, the image data that is processed by the processing section 8 is stored into the storing section 9. It is not output to the image output terminal 3.

When the image data to be processed has all been entered by the job control sheet, the image processing system is placed to a ready state, viz., ready for the next job. When the next job has already been set, processing of the next job immediately starts.

If required, the operator may alter the operation instruction data of the job that is stored in the abnormal processing, by using the instruction altering section 10. The instruction altering section 10 may be a control panel or rereading of the altered job control sheet. When the operator alters the operation instruction data of the job that is stored in the abnormal processing, to the operation instruction that can be executed, the stored image data is processed. For example, if the operator alters the magnification percentage to 70%, the control section 4 sets the image magnification of the processing section 8 to 70%, and the image data is read out of the storing section 9 and processed.

Thus, when the data is input to the image processor 1, the storing section 9 stores the data irrespective of the processing of the data. Accordingly, there are eliminated the time to let the processing go ahead and the waiting time.

Figure 2:
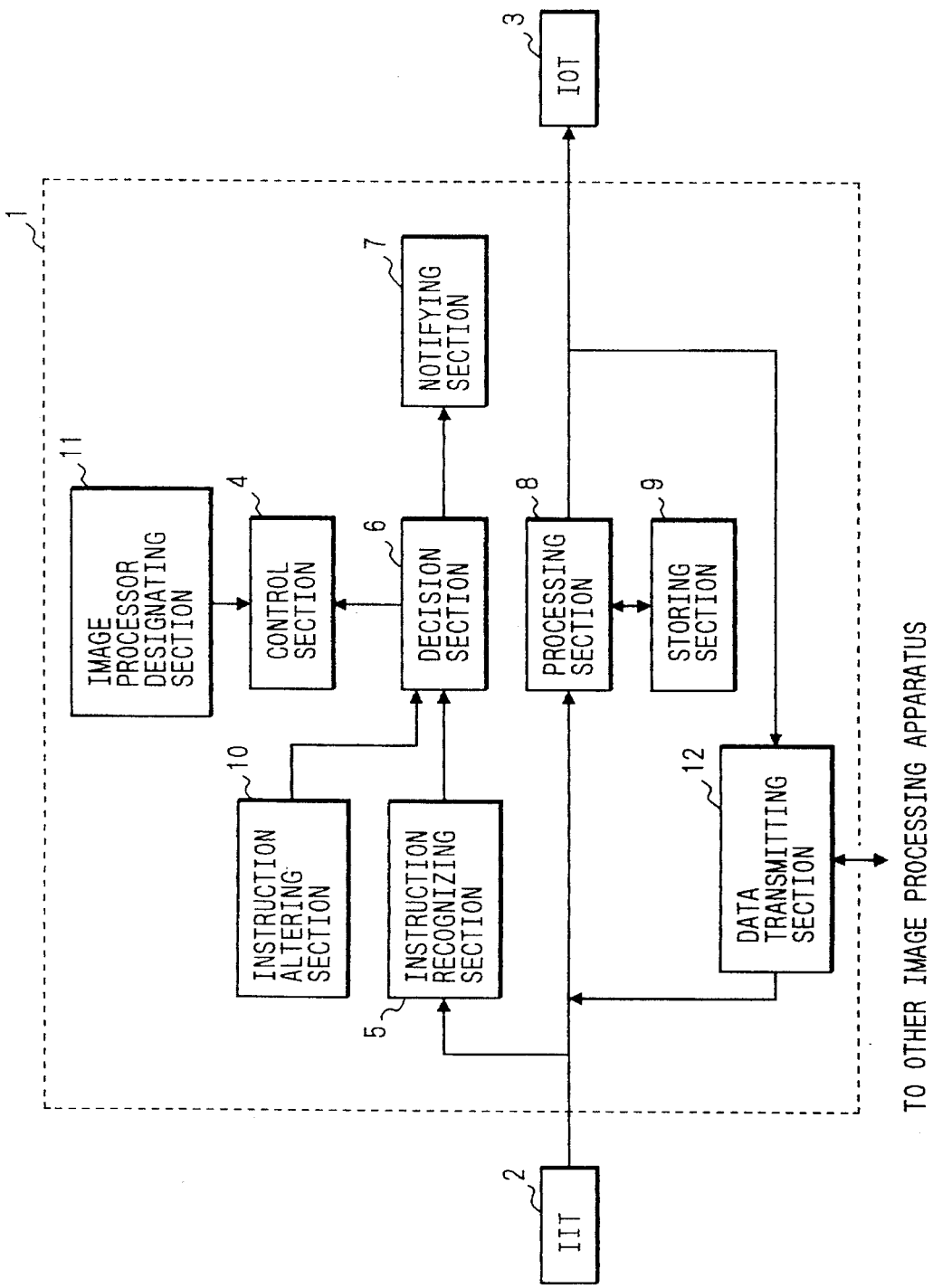
FIG. 2 is a block diagram showing a second embodiment of the invention.

FIG. 2 is a block diagram showing the arrangement of an image processing system according to a second embodiment of the present invention. In the second embodiment, the image processor 1 additionally contains a data transmitting section 12 for transmitting data including image data among a plural number of image processors, and an image processor designating section 11 for designating any of image processors. In the first embodiment, the execution-impossible notice is carried out by only the image processor 1 in which the job is set. In the second embodiment, the same can be carried out by another image processor 1 mutually connected to the image processor 1 having the job set therein.

Figure 8:
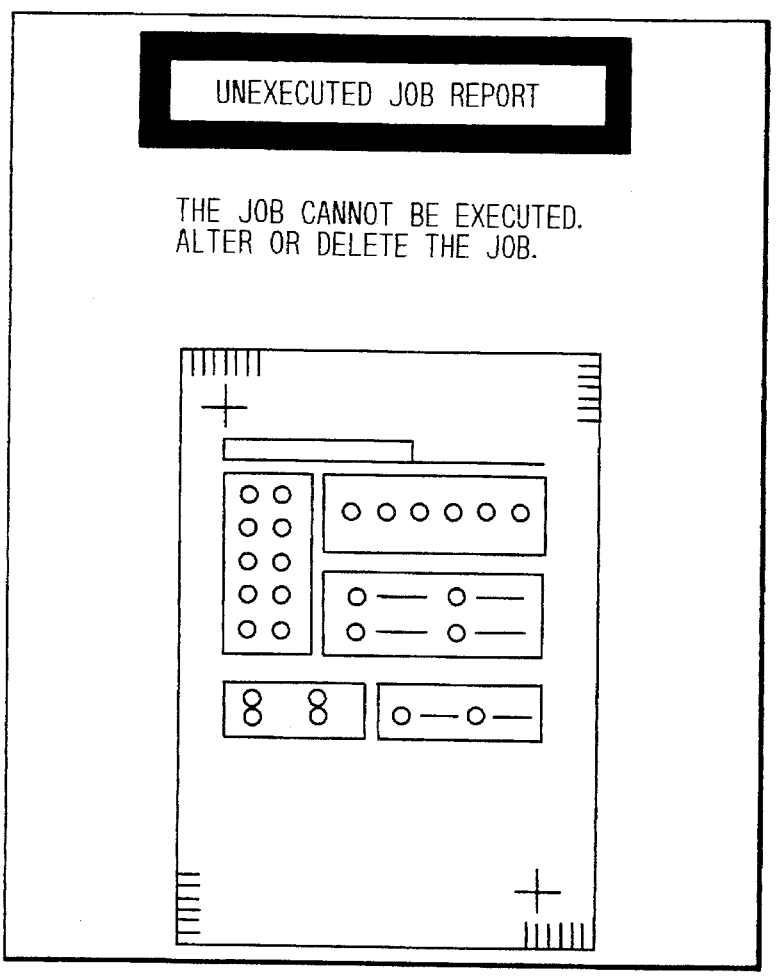
FIG. 8 is a diagram showing an unexecuted job report as an example of the notice of instruction execution being impossible, which is output according to the third embodiment of the invention.

According to the second embodiment, after setting a number of jobs in a large and high speed image processor 1, the operator of the system returns to his desk for another work till the jobs have been done. Further, the operator can operate a small image processor 1 located near or a much smaller image processor 1 on his desk for performing the execution-impossible notice. To be more specific, in a case where the execution-impossible notice is performed by printing out an unexecuted job report as shown in FIG. 8, the operator can operate the small image processor near or the much smaller image processor 1 on his desk to print out the unexecuted job report. In that event, the operator previously designates the image processor 1 to be used for the execution-impossible notice by using the image processor designating section 11.

Also in the second embodiment, the operation instruction data of the job that is stored in the abnormal processing can be altered by using the instruction altering section 10, which is installed in another image processor 1 mutually connected to the image processor 1 having the job set therein. In the previous example, the operator can alter the operation instruction data by using the instruction altering section 10, which is contained in the small image processor 1 near his desk or the much smaller image processor 1 on his desk. More specifically, where the operation instructions are altered by reading the altered job control sheet again, the operator can enter the data of the altered job control sheet and transmit it to the image processor 1 by which it is to be processed, by using a small scanner located near his desk or a much smaller scanner on his desk. On reception of the scan-read image data of the altered job control sheet, the image processor 1 processes the stored image data as in the case of the first embodiment.

Figure 9:
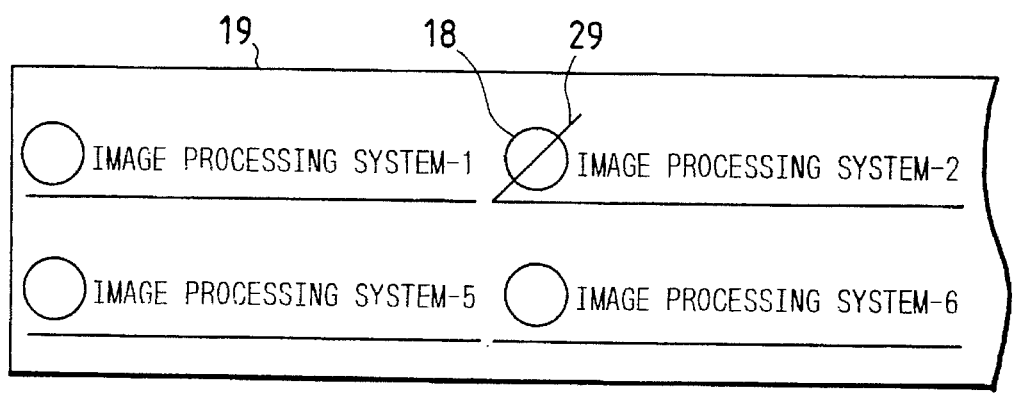
FIG. 9 is a diagram showing the image processor selections in the sheet of FIG. 6.
Figure 10:
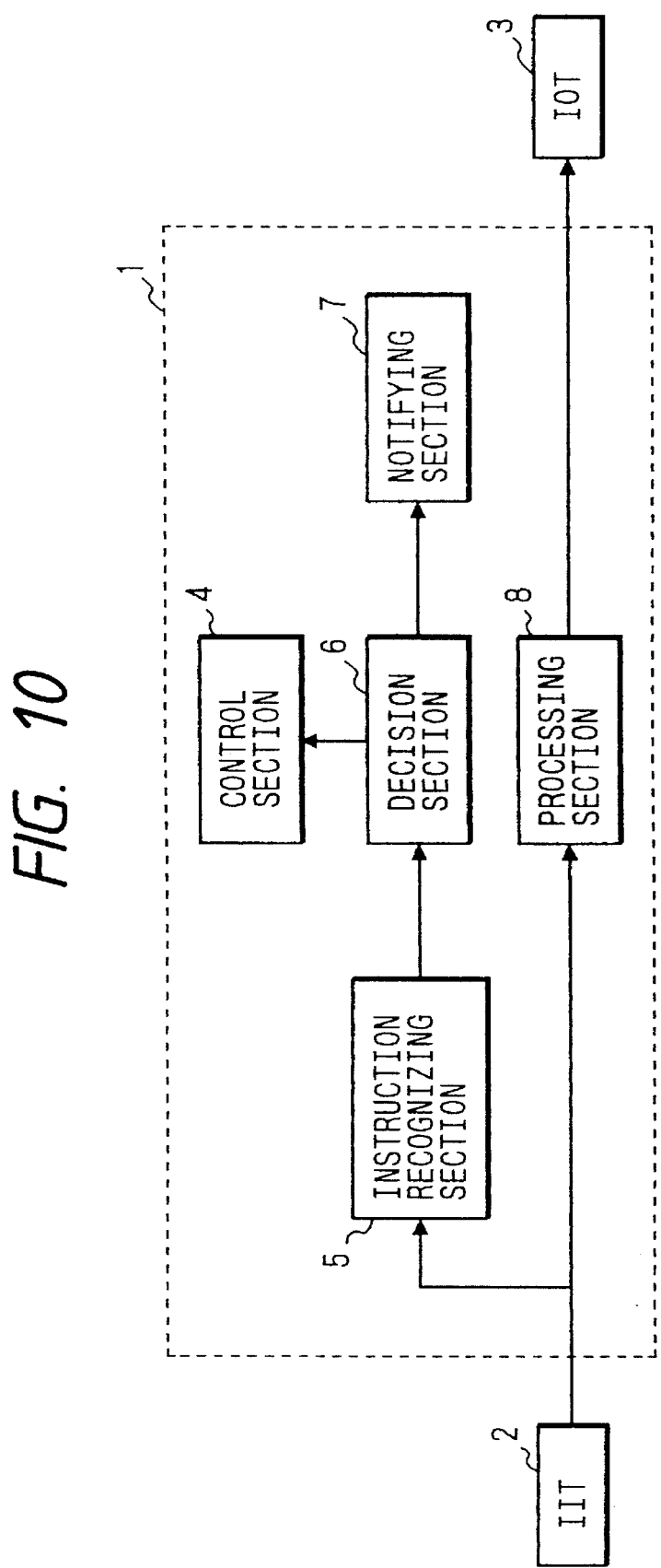
FIG. 10 is a block diagram showing a conventional image processing system.

In this way, the altering time problem can be solved. FIG. 6 is a view showing the job control sheet according to a third embodiment of the present invention. The sheet contains image processor selections for selectively designating an image processor to be used for notifying the operator of the instruction execution being impossible (for details, reference is made to FIG. 9). In the second embodiment, as recalled, the image processor used for the execution-impossible notice is previously designated by the image processor designating section 11. In the third embodiment, the image processor for the execution-impossible notice is recognized by the instruction recognizing section 5 when the job control sheet is entered.

Figure 7:
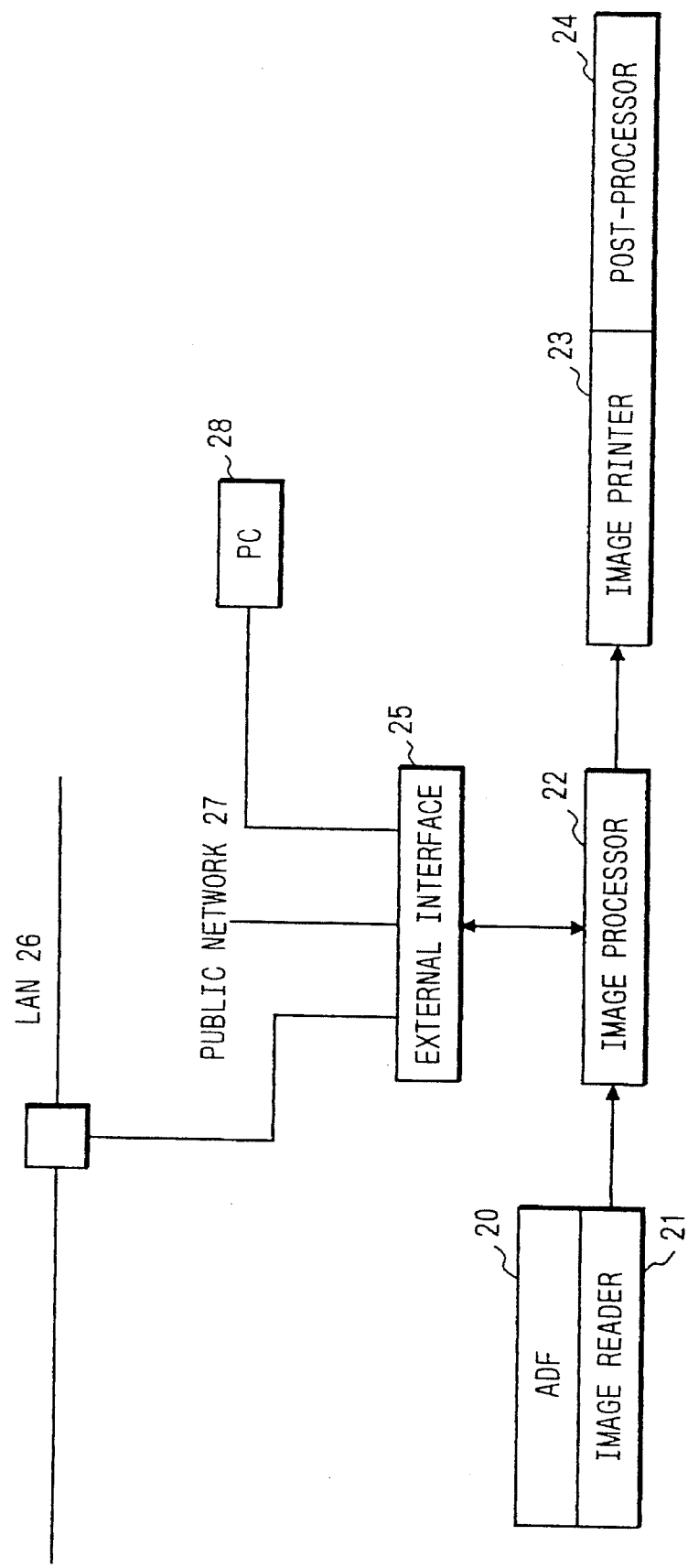
FIG. 7 is a block diagram showing a multi-functional digital copying machine as an application of the present invention.

FIG. 7 is a block diagram showing a multi-functional digital copying machine to which the present invention is applied. As shown, the digital copying machine is connected via an external interface 25 to a LAN 26, a public communication channel 27 and a personal computer 28. The LAN 26 and the public communication channel 27 may be connected to multi-functional digital copying machines arranged as shown in FIG. 7. In that event, data may be transferred among those digital copying machines.

Figure 11:
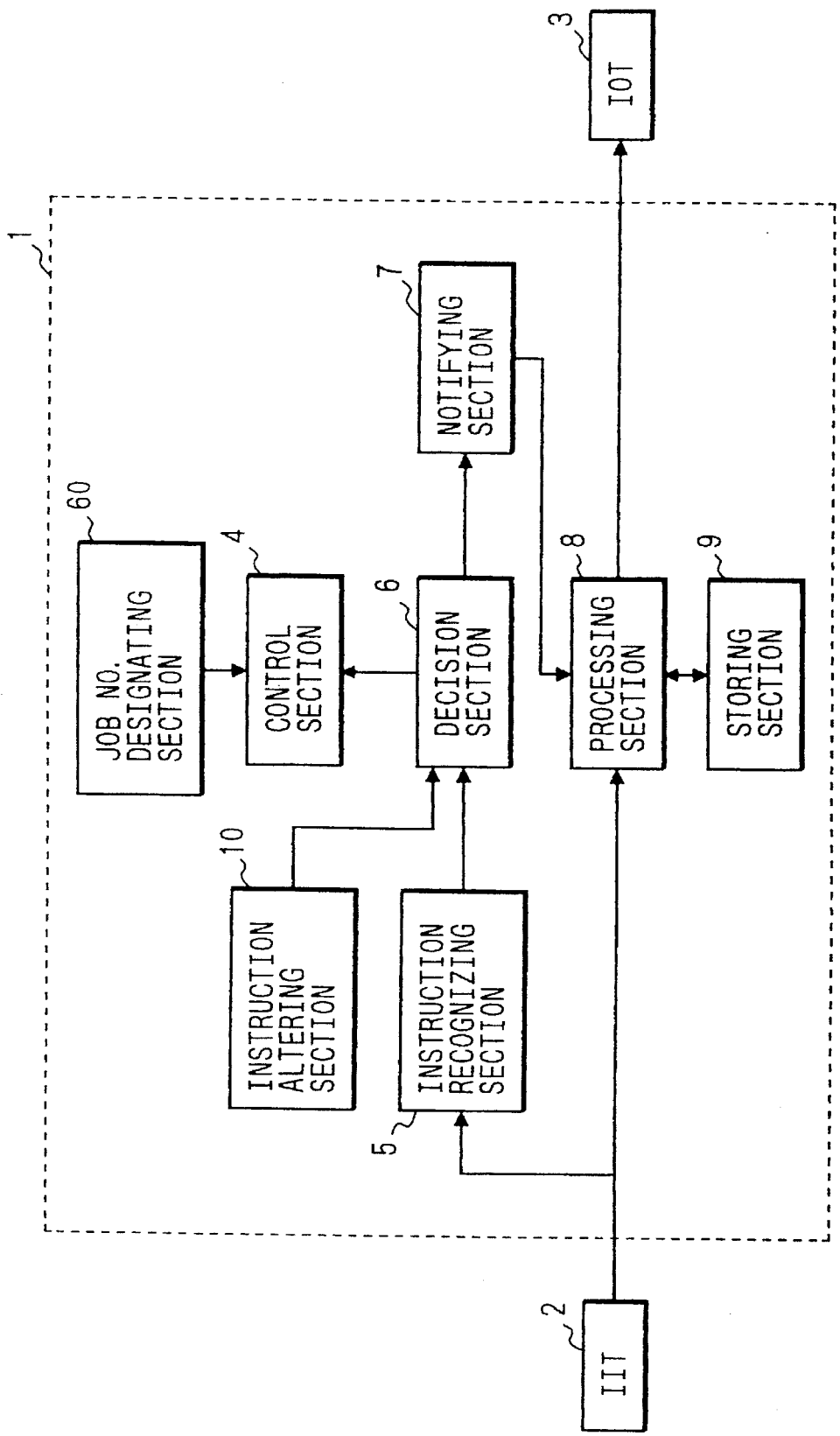
FIG. 11 is a block diagram showing a fourth embodiment of the invention.
Figure 13:
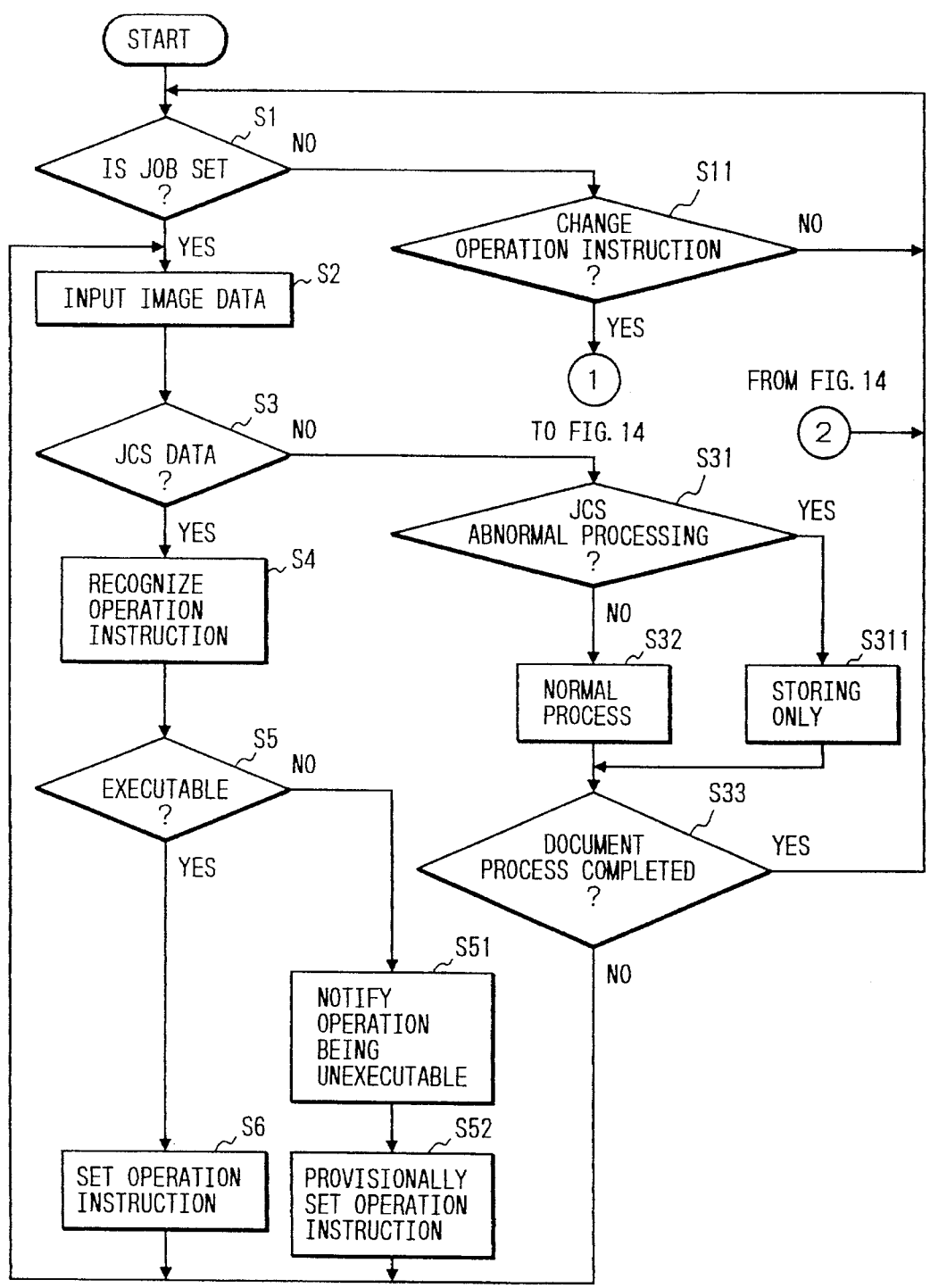
FIG. 13 is a flowchart showing the operation of the FIG. 11 system.
Figure 14:
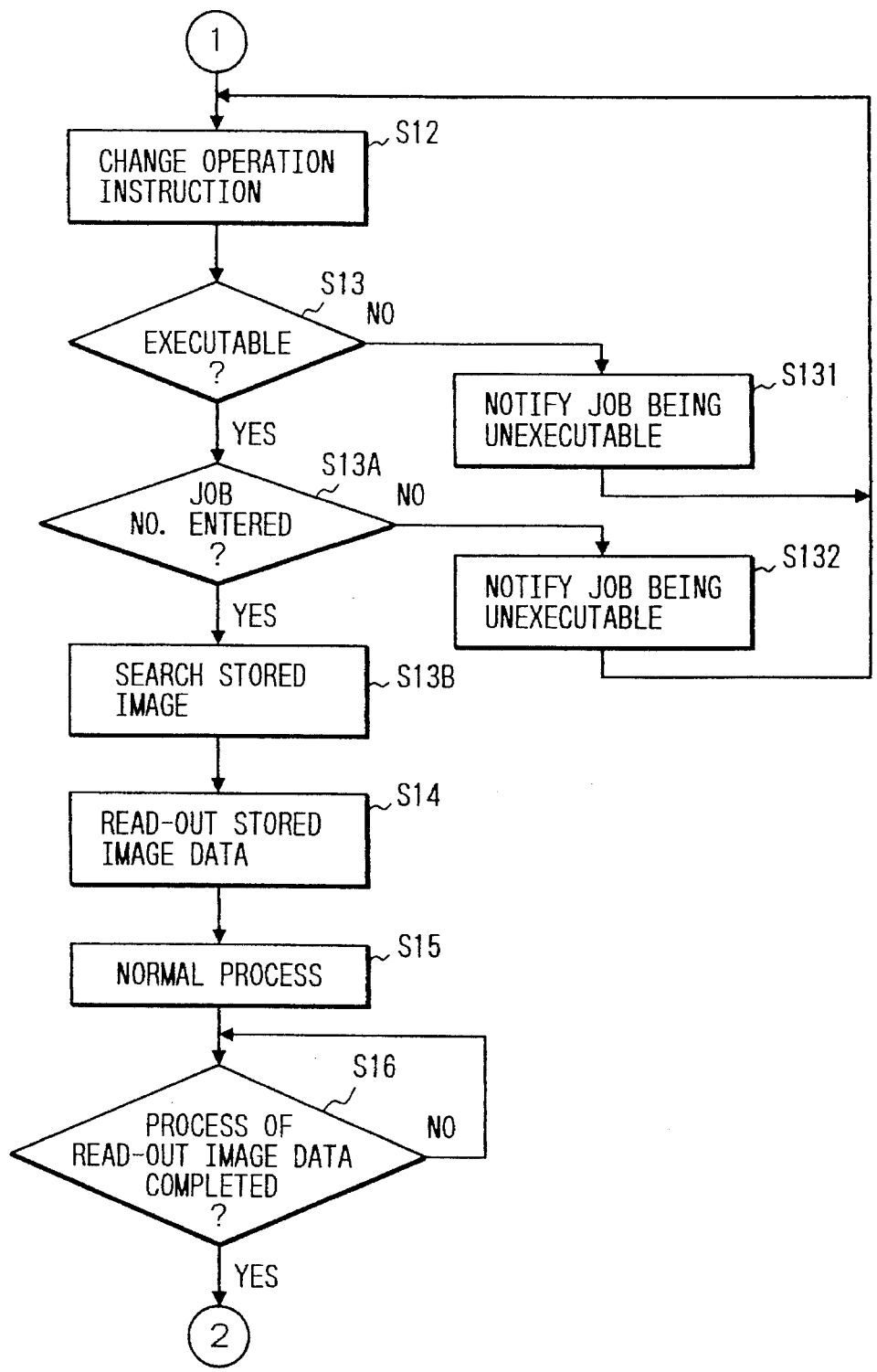
FIG. 14 is a flowchart showing the operation of the FIG. 11 system.

FIG. 11 is a block diagram showing an image processing system using the paper user interface according to a fourth embodiment of the present invention. FIGS. 13 and 14 cooperate to form a flow chart showing a control flow in the image processing system.

The image processing system includes an image input terminal (IIT) 2 for inputting image data, an image processor 1 for processing the image data received from the image input terminal 2, and an image output terminal 3 for outputting the image data processed by and output from the image processor 1.

The image processor 1 is made up of a control section 4, an operation instruction recognizing section 5, a decision section 6, a notifying section 7, a processing section 8, a storing section 9, an operation instruction altering section 10, and a job identification number designating section 60. The instruction recognizing section 5 determines whether the input image data is a job control sheet or another image data, and if it is the job control sheet, recognizes information of machine operation instructions, which are described in the job control sheet. The decision section 6 decides whether the operation instructions recognized by the instruction recognizing section 5 can be executed or not. The notifying section 7 functions such that when the instruction execution is impossible, it notifies the operator of the instruction execution being impossible. The processing section 8 is provided for processing the input image data. The storing section 9 stores the image data processed by the processing section 8. The instruction altering section 10 is used when the operator alters the operation instructions. The control section 4 is provided for the overall control of the image processor 1, and for the intersubsystem controls between the image processor 1 and the image input terminal 2 and between the image processor 1 and the image output terminal 3. The job identification number designating section 60 designate a job identification number for the control section 4.

Figure 18:
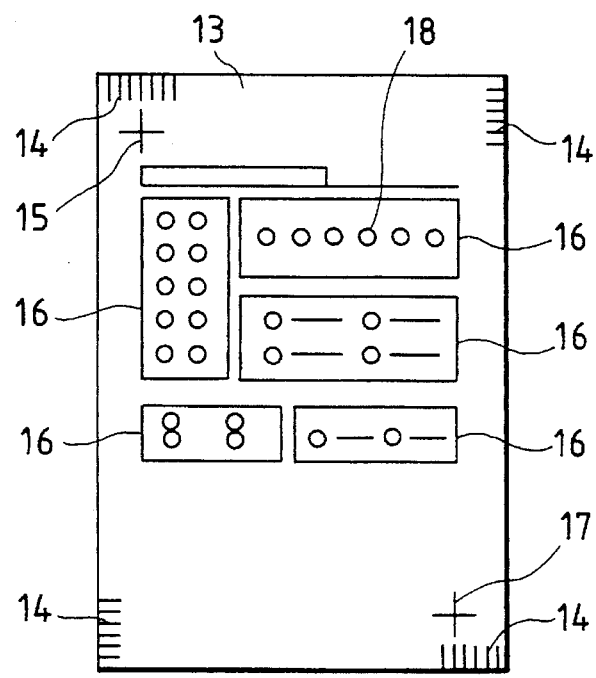
FIG. 18 is a diagram showing a conventional job control sheet.
Figure 19:
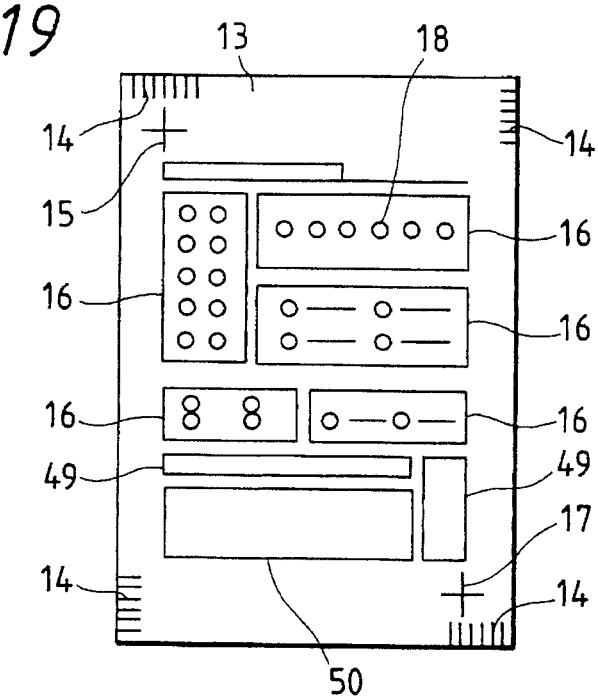
FIG. 19 is a diagram showing a job control sheet used in an embodiment of the invention.

As shown in FIGS. 18 and 19, a job control sheet 13 contains document identification marks 14 located at the four corners of the sheet. The instruction recognizing section 5 checks whether the identification marks 14 are present or absent, and determines whether the input image data is the job control sheet or another image data depending on the result of the check. In the present invention, when the job execution is impossible, a job control sheet format shown in FIG. 19 is entered in order to compose an error message and a job identification number on the sheet.

If the image data input to the image processor 1 is the job control sheet, the processing of recognizing the operation instructions is performed. To start, two coordinates points 15 and 17, an origin and a point positioned diagonal to the origin, are recognized. The recognition of the information described on the sheet is based on those two points. After the two points are recognized, it is detected whether or not check circles 18 at predetermined coordinates positions have been checked, on the basis of the base points. The result of the detection is operation instruction information described on the job control sheet.

The operation instruction information recognized by the instruction recognizing section 5 is transferred to the decision section 6. The decision section 6 decides whether execution of the operation instructions are possible or impossible. The result of the judgement is transferred to the control section 4. If the execution of the operation instruction is possible, the control section 4 sets the processing section 8 and the storing section 9 according to the operation instruction data, and executes the job in cooperation with the image input terminal 2 and the image output terminal 3.

Figure 20:
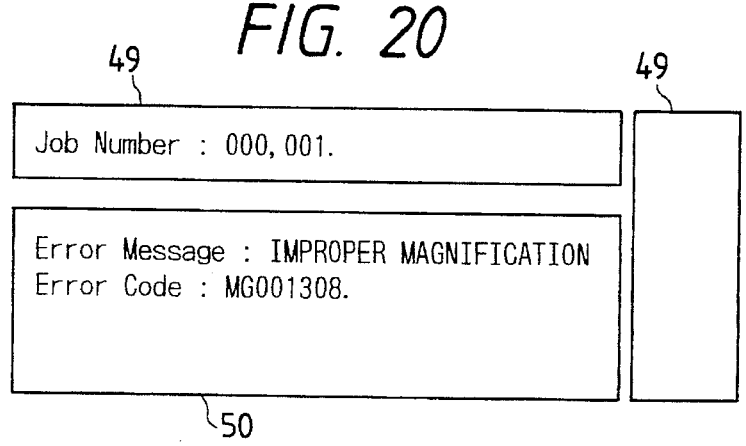
FIG. 20 is a diagram showing a job control sheet used in the embodiment of the invention in which the blanks for Job Number and Error message are respectively filled with a series of figures and an error message.

If the execution of the operation instruction is impossible, for example, when an operator has mistakenly ticked both 70% and 200% for magnification selections, the notifying section 7 notifies the operator of the instruction execution being impossible, in cooperation with the processing section 8 and the image output terminal 3. The notice may be made by outputting the job control sheet image. To make the notice, the notifying section 7 first outputs to the processing section 8 an error message and a job identification number attached to the input image data to be processed by the job control sheet. The processing section 8 composes the error message and the job number on the job control sheet image. Thereafter, the processing section 8 outputs the composed image to the image output terminal 3 which in turn outputs the notice of the instruction execution being impossible (FIG. 20).

Afterwards, the control section 4 provisionally sets the processing section 8 and the storing section 9. More exactly, in the above case, other operation instructions than the magnification are set in accordance with the operation instruction data, and a default value is set for the magnification. If the default value is 100%, the magnification instruction is set to 100%. On completion of the provisional setting, the inputting of the image data starts again. In this case, the processing currently progressing is an abnormal processing. Accordingly, the image data that is processed by the processing section 8 is stored into the storing section 9. It is not output to the image output terminal 3.

When the image data to be processed has all been entered by the job control sheet, the image processing system is placed to a ready state, viz., ready for the next job. When the next job has already been set, processing of the next job immediately starts.

When, by using the instruction altering section 10, the operator alters the operation instruction data of the job that is stored in the abnormal processing, to the operation instruction that can be executed, the decision section 6 decides whether execution of the altered operation instruction is possible or impossible. If the execution of the altered operation instruction is impossible, the notifying section 7 cooperates with the processing section 8 and the image output terminal 3 to notify the operator of the instruction execution being impossible. If the instruction execution is possible, the instruction altering section 10 checks if the job identification number has been entered. If it has not been entered, the notifying section 7 cooperates with the processing section 8 and the image output terminal 3 to notify the operator of the instruction execution being impossible. If it has been entered, the image data stored is retrieved using the job number. In the case as mentioned above, if the operator alters the magnification percentage to 70%, the control section 4 sets the image magnification of the processing section 8 to 70%, and the image data is read out of the storing section 9 and processed.

Figure 12:
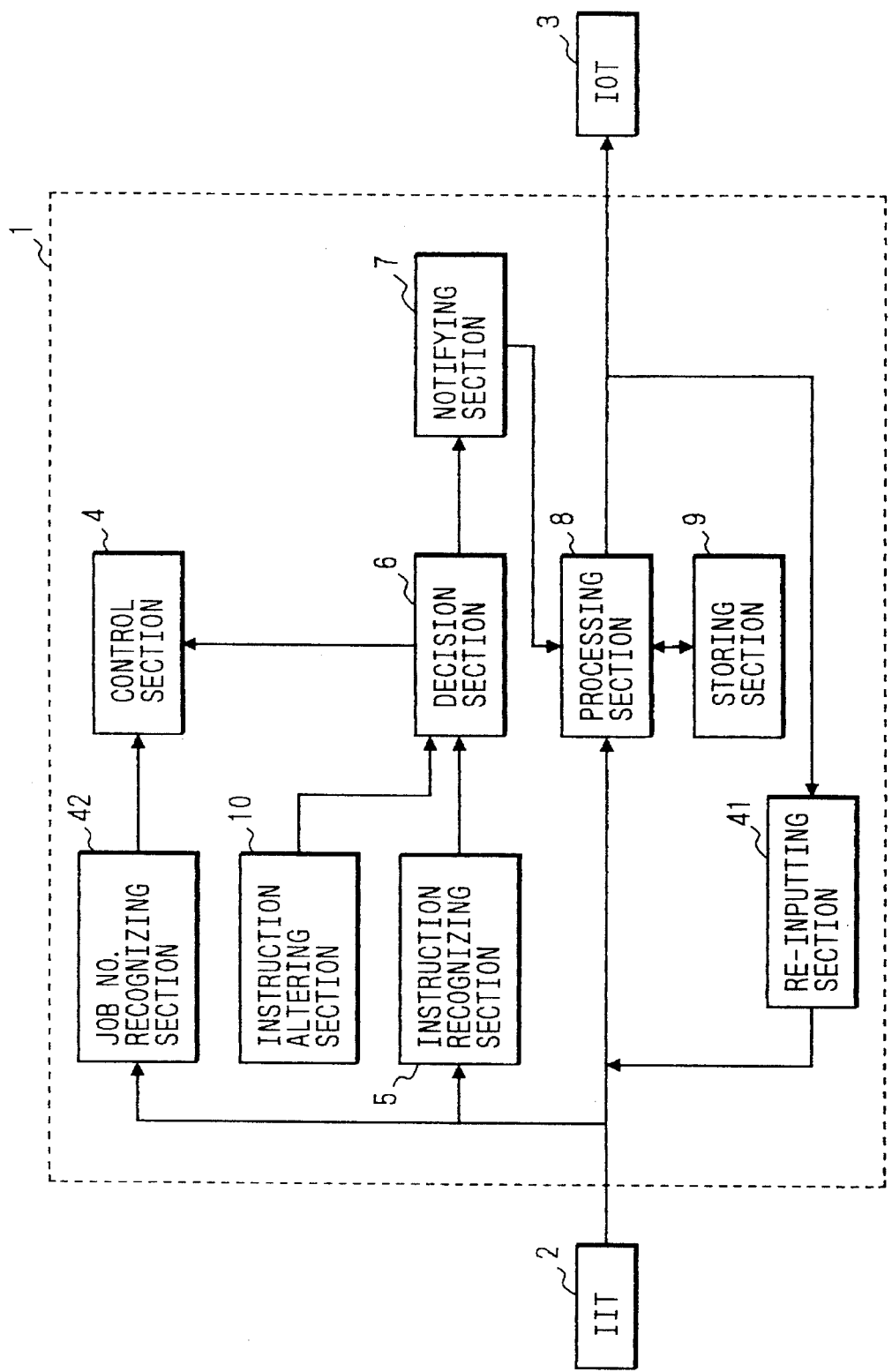
FIG. 12 is a block diagram showing a fifth embodiment of the invention.
Figure 15:
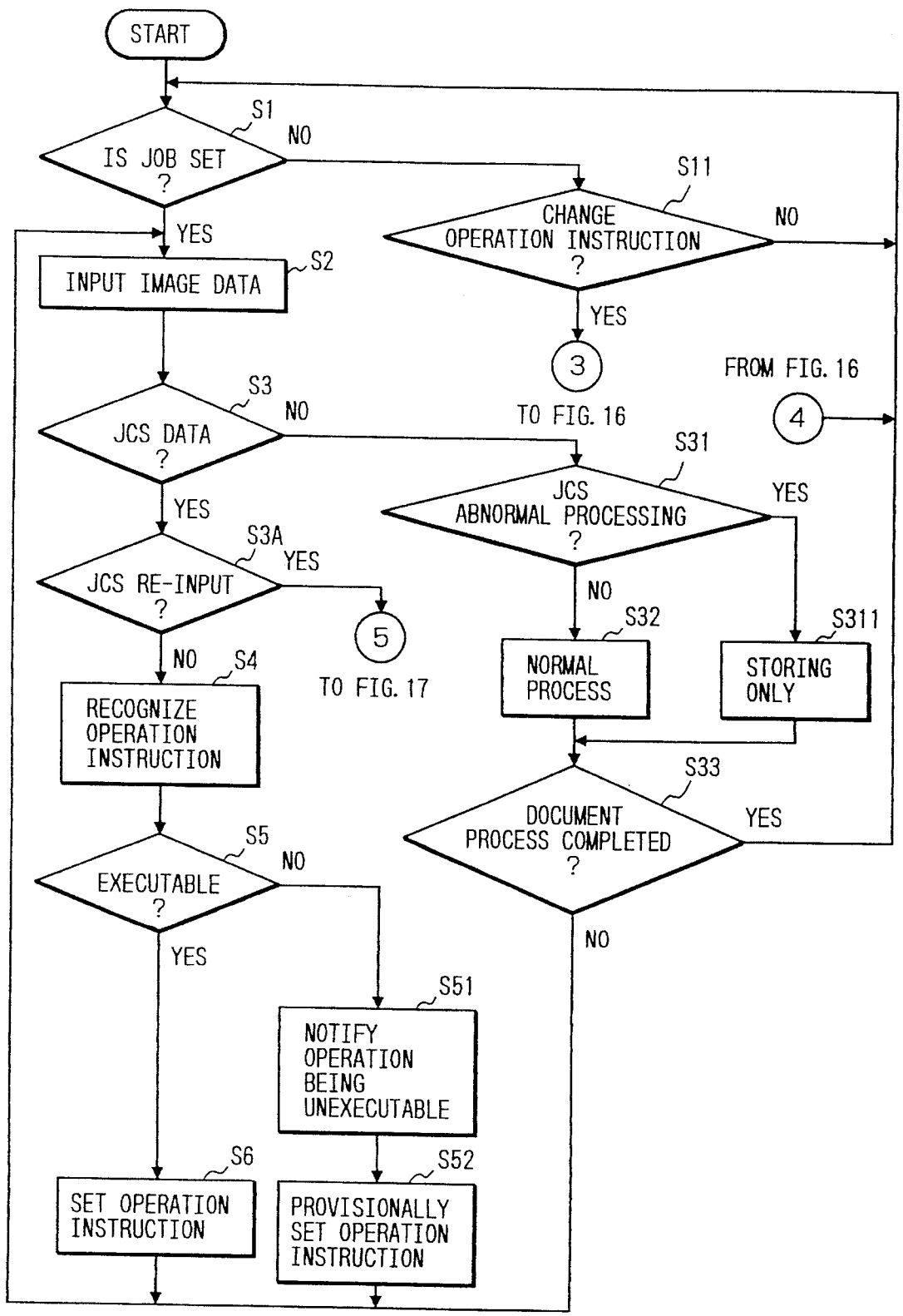
FIG. 15 is a flowchart showing the operation of the FIG. 12 system.
Figure 16:
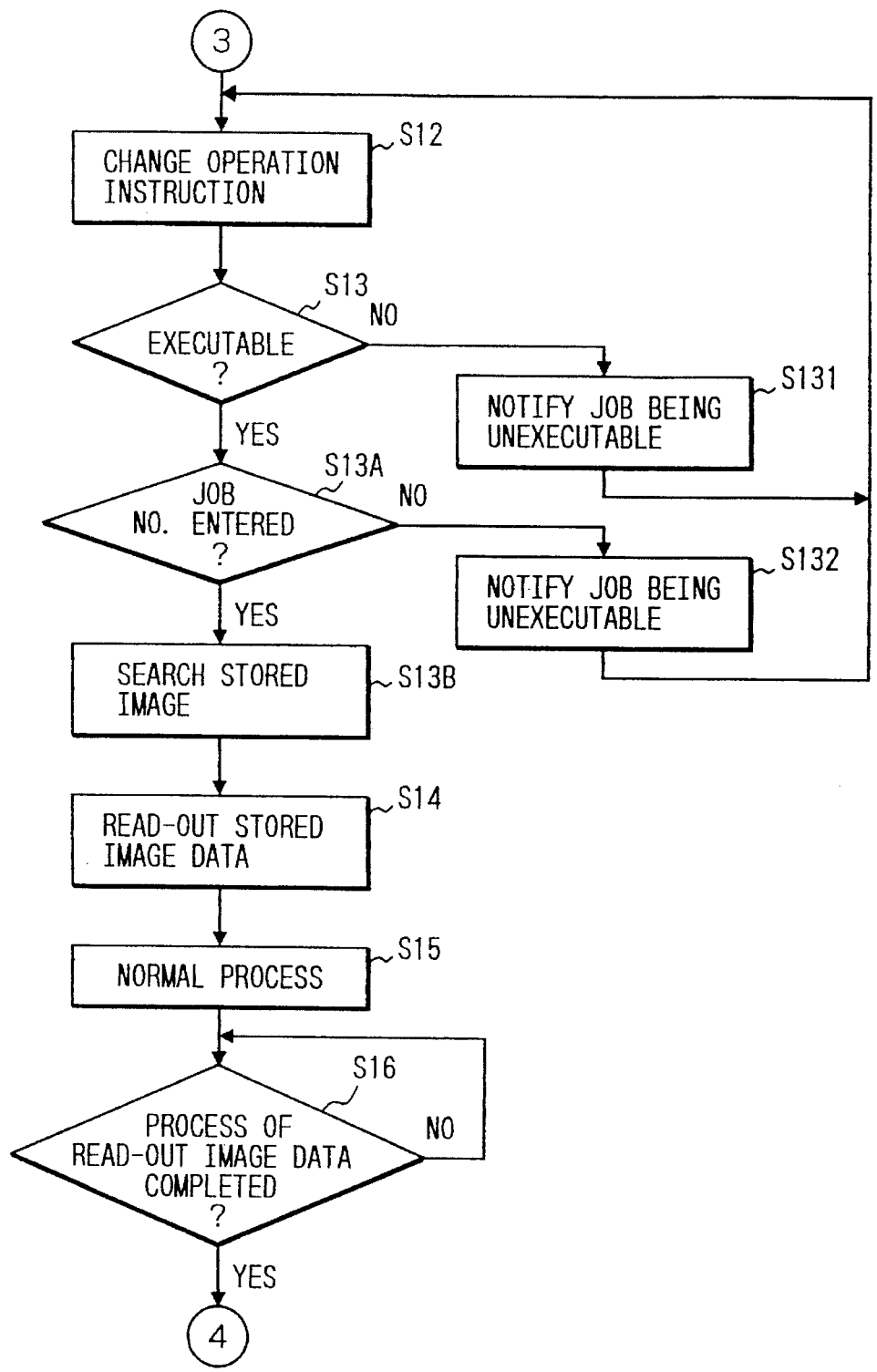
FIG. 16 is a flowchart showing the operation of the FIG. 12 system.
Figure 17:
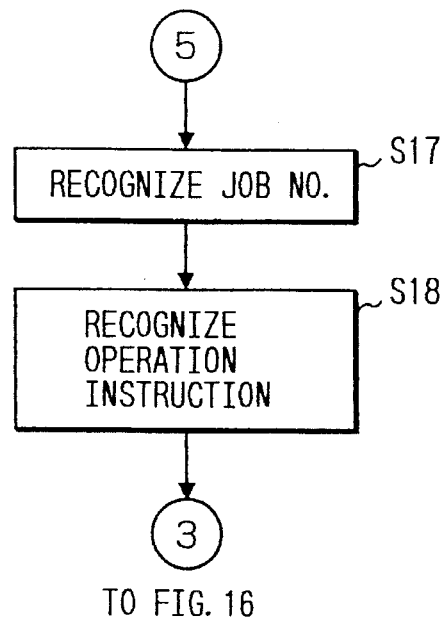
FIG. 17 is a flowchart showing the operation of the FIG. 12 system.

FIG. 12 is a block diagram showing an image processing system using the paper user interface according to a fifth embodiment of the present invention. FIGS. 15, 16 and 17 cooperate to form a flow chart showing a control flow in the image processing system. In the image processing system, the image processor 1 additionally includes re-inputting section 41 for receiving the job control sheet image after output from the image output terminal 3, and job identification number recognizing section 42 for recognizing a job identification number from the job control sheet image, that is input again to the image processor through the re-inputting section 41.

Figure 21:
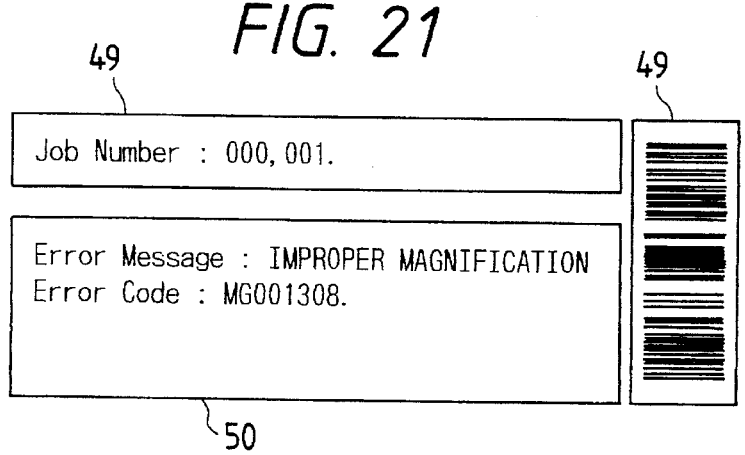
FIG. 21 is a diagram showing a job control sheet used in the embodiment of the invention in which the blanks for Job Number and Error message are respectively filled with a series of figures, a bar code, and an error message.

As in the fourth embodiment, when image data is input to the image processor 1, the instruction recognizing section determines whether the input image data is a job control sheet or another image data. If it is the job control sheet, it is determined whether it is the job control sheet input again through the re-inputting section 41 or not. If it is not the job control sheet coming in through the re-inputting section 41, the decision section 6 decides whether execution of the operation instructions is possible or impossible, as in the fourth embodiment. If the instruction execution is impossible, a job identification number read by the operator, a job identification number recognized by the job identification number recognizing section 42, and an error message indicating the instruction execution being impossible are composed on the job control sheet image, the composed image notifying the operator of the instruction execution being impossible (see FIG. 21).

When the operator receives the notice of the instruction execution being impossible and alters the operation instruction which cannot be executed to the operation instruction which can be executed, and enters again the operation instruction from the re-inputting section 41, the re-inputting processing is carried out. When the instruction recognizing section determines that the input image data is the job control sheet entered from the re-inputting section 41, the job identification number recognizing section 42 recognizes the job identification number. The recognized job identification number is transferred to the control section 4. When the job identification number is recognized, the instruction recognizing section 5 recognizes the operation instruction, and the recognized operation instruction is transferred to the decision section 6. The subsequent operation will be performed as in the fourth embodiment.

FIG. 22 is a block diagram showing a multi-functional digital copying machine to which the present invention is applied. As shown, the digital copying machine is connected via an external interface 25 to a LAN 26, a public communication channel 27 and a personal computer 28. The LAN 26 and the public communication channel 27 may be connected to multi-functional digital copying machines arranged as shown in FIG. 19. In that event, data may be transferred among those digital copying machines.

As described above, in the image processing system of the invention, even when a job control sheet that cannot be processed is input to the image processor by the operator, the image processing system can continue the processing without suffering from any great interference. The job that can be processed is carried out as soon as the operation instruction is altered to an operation instruction that can be executed. Accordingly, the time taken for the system to wait for the re-execution of the job is reduced to the minimum, speeding up the job production.

Additionally, when the job control sheet that cannot be executed is input to the processor, the notice of the job execution being impossible can be output from an image processor installed at a desired location. The operator can also modify or alter the machine operation instructions by using the an image processor installed at his desired location. Accordingly, the fault time per se can be reduced, whereby realizing highly efficiently operable image processing systems.

According to the invention, even when a job control sheet that cannot be processed is input to the image processor by the operator, the image processing system can continue the processing without suffering from any great interference. The job that can be processed is carried out as soon as the operation instruction is altered to an operation instruction that can be executed. Accordingly, the time taken for the system to wait for the re-execution of the job is reduced to the minimum, speeding up the job production.

When the job control sheet that cannot be executed is input to the processor, the operator can also modify or alter the machine operation instructions in the job control sheet that is output in the form of the notice of the instruction execution being impossible. In this case, there is no need of entering the job number by the operator. Accordingly, the fault time per se can be reduced, whereby realizing highly efficiently operable image processing systems.

What is claimed is:

1. An image processing system for applying the processings of a plural number of jobs to an input image data according to machine operation instructions, which are definitely described in a job control sheet, and outputting the processed image data, comprising:

instruction recognizing means for recognizing said machine operation instructions stored in the job control sheet;

decision means for deciding whether execution of said recognized machine operation instructions is possible or impossible;

processing means operating such that when execution of the machine operation instruction is possible, said processing means processes the input image data, which is to be processed according to the job control sheet, and outputs the processed image data;

storing means for storing the input image data including the input image data corresponding to an unexcutable job control sheet operation instruction;

instruction altering means by which an operator of the image processing system alters the machine operation instructions to enable execution of the unexcutable operation instruction; and control means for controlling said instruction recognizing means, said decision means, said processing means, said storing means, and said instruction altering means; wherein, when the unexcutable machine operation instruction, which is supplied from the job control sheet, is recognized, the corresponding input image data is stored in said storing means, and not output, while another job queue waiting for the processing is processed, unless said instruction altering means enables execution of the unexecutable operation instruction.

2. The image processing system according to claim 1, further comprising means for notifying the operator of the job being impossible in execution when the machine operation instruction cannot be executed, and wherein when the machine operation instruction, which is supplied from the job control sheet and recognized, cannot be executed, the input image data processed according to the operation instruction of the job control sheet are stored into said storing means, not output, and the notifying means notifies the operator of the job being impossible in execution, while another job waiting for the processing is processed.

3. The image processing system according to claim 2, in which when the machine operation instruction, which is supplied from the job control sheet and recognized, cannot be executed, the input image data processed according to the operation instruction of the job control sheet are stored into said storing means, not output, and the notifying means notifies the operator of the job being impossible in execution, while another job waiting for the processing is processed, and when the operator alters the machine operation instruction, which is supplied from the job control sheet and recognized, into a machine operation instruction that can be executed, the input image data to be processed according to the altered operation instruction of the job control sheet is read out of said storing means, and the read out input image data is processed and output.

4. The image processing system according to claim 3, further comprising data transmission means for transmitting data among a plural number of image processing systems and image processing system designating means for designating one of said plural number of image processing systems, and wherein when the machine operation instruction, which supplied from the job control sheet and recognized, cannot be executed, the input image data processed according to the operation instruction of the job control sheet are stored into said storing means, not output, and said notifying means notifies the operator of the job being impossible in execution, through the image processing system which the operator has designated using said image processing system designating means.

5. The image processing system according to claim 4, in which the machine operation instruction, which is supplied from the job control sheet and recognized, cannot be executed, the input image data processed according to the operation instruction of the job control sheet are stored into said storing means, not output, and said notifying means notifies the operator of the job being impossible in execution, through the image processing system which the operator has designated using said image processing system designating means, and said notifying means notifies the operator of the job being impossible in execution, through another image processing system having operation instruction altering means capable of altering the machine operation instructions.

6. The image processing system according to claim 5, in which said image processing system designating means for designating one of said plural number of image processing systems is contained in the job control sheet.

7. The image processing system according to claim 4, in which said image processing system designating means for designating one of said plural number of image processing systems is contained in the job control sheet.

8. The image processing system according to claim 2, further comprising data transmission means for transmitting data among a plural number of image processing systems and image processing system designating means for designating one of said plural number of image processing systems, and wherein when the machine operation instruction, which is supplied from the job control sheet and recognized, cannot be executed, the input image data processed according to the operation instruction of the job control sheet are stored into said storing means, not output, and said notifying means notifies the operator of the job being impossible in execution, through the one image processing system which the operator has designated using said image processing system designating means.

9. The image processing system according to claim 7, in which when the machine operation instruction, which is supplied from the job control sheet and recognized, cannot be executed, the input image data processed according to the operation instruction of the job control sheet are stored into said storing means, not output, and notifies the operator of the job being impossible in execution, through the image processing system which the operator has designated using said image processing system designating means, and said notifying means notifies the operator of the job being impossible in execution, through another image processing system having operation instruction altering means capable of altering the machine operation instructions.

10. The image processing system according to claim 8, in which said image processing system designating means for designating one of said plural number of image processing systems is contained in the job control sheet.

11. An image processing system for applying the processings of a plural number of jobs to an input image data according to the machine operation instructions, which are definitely described in a job control sheet, and outputting the processed image data, comprising:

instruction recognizing means for recognizing the machine operation instructions stored in the job control sheet;

decision means for deciding whether execution of the recognized machine operation instructions is possible or impossible;

processing means operating such that when execution of the machine operation instruction is possible, said processing means processes the input image data, which is to be processed according to the job control sheet, and outputs the processed image data;

means for notifying an operator of the job being impossible in execution when the machine operation instruction cannot be executed;

storing means for storing the input image data including the input image data corresponding to an unexecutable job control sheet operation instruction;

instruction altering means by which the operator of the image processing system alters the machine operation instruction to enable execution of the unexcutable operation instruction; and control means for controlling said instruction recognizing means, said decision means, said processing means, said storing means, and said instruction altering means; wherein, when the unexcutable machine operation instruction, which is supplied from the job control sheet, is recognized, the corresponding input image data is stored in said storing means, and not output, while another job queue waiting for the processing is processed, unless said instruction altering means enables execution of the unexecutable operation instruction; and wherein said notifying means notifies the operator of the unexecutable machine operation instruction, an error message indicating that the machine operation instruction cannot be executed and a job identification number attached to the input image data, which is to be processed according to the operation instruction of the job control sheet, is composed on the output job control sheet image, and wherein, when the operator alters the machine operation instruction, which is supplied from the job control sheet and recognized, into the machine operation instruction that can be executed, said job control sheet is retrieved using the job identification number, and the input image data to be processed according to the altered operation instruction of said retrieved job control sheet is read out of said storing means, and the read out input image data is processed and output.

12. The image processing system according to claim 11, further comprising re-inputting means for re-inputting said job control sheet image containing the error message indicating that the machine operation instruction cannot be executed and the job identification number attached to the input image data, which is to be processed according to the operation instruction of the job control sheet, and job identification number recognizing means for recognizing the job identification number from the re-input job control sheet image, and when the operator alters the machine operation instruction on the output job control sheet image into the machine operation instruction that can be executed, the job identification number is recognized from the re-input job control sheet image, the job control sheet is retrieved using the job identification number, and the input image data to be processed according to the altered operation instruction of said retrieved job control sheet is read out of said storing means, and the read out input image data is processed and output.

* * * * *

UNITED STATES PATENT AND TRADEMARK OFFICE
CERTIFICATE OF CORRECTION

PATENT NO. : 5,563,986          Page 1 of 2
DATED : October 08, 1996
INVENTOR(S) : Tadaomi SUZUKI It is certified that error appears in the above-indentified patent and that said Letters Patent is hereby corrected as shown below:

Claim 1, Column 12, line 53, "unexcutable" should read --unexecutable--.

Claim 1, Column 12, line 58, "unexcutable" should read --unexecutable--.

Claim 1, Column 12, line 63, "unexcutable" should read --unexecutable--.

Claim 4, Column 13, line 36, before "supplied", insert --is--.

UNITED STATES PATENT AND TRADEMARK OFFICE
CERTIFICATE OF CORRECTION

PATENT NO. : 5,563,986
DATED : October 08, 1996
INVENTOR(S) : Tadaomi SUZUKI

It is certified that error appears in the above-indentified patent and that said Letters Patent is hereby corrected as shown below:

Claim 11, Column 14, line 55, "unexcutable" should read --unexecutable--.

Claim 11, Column 14, line 60, "unexcutable" should read --unexecutable--.

Signed and Sealed this

Twenty-ninth Day of April, 1997

Attest:

BRUCE LEHMAN

*Attesting Officer*  *Commissioner of Patents and Trademarks*